(12) United States Patent  (10) Patent No.: US 8,145,822 B2
Hachmann et al.  (45) Date of Patent: Mar. 27, 2012

(54) COMPUTER SYSTEM FOR ELECTRONIC DATA PROCESSING

(75) Inventors: Ulrich Hachmann, Neubiberg (DE); Christian Sauer, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 641 days.

(21) Appl. No.: 10/592,925

(22) PCT Filed: Mar. 10, 2005

(86) PCT No.: PCT/DE2005/000430
§ 371 (c)(1),
(2), (4) Date: Aug. 26, 2008

(87) PCT Pub. No.: WO2005/091131
PCT Pub. Date: Sep. 29, 2005

(65) Prior Publication Data
US 2009/0235047 A1  Sep. 17, 2009

(30) Foreign Application Priority Data
Mar. 15, 2004 (DE) .......................... 10 2004 012 516

(51) Int. Cl.
*G06F 15/163* (2006.01)

(52) U.S. Cl. ............................ 710/310; 712/34; 712/35
(58) Field of Classification Search .................. 710/310; 712/34, 35
See application file for complete search history.

(56) References Cited

U.S. PATENT DOCUMENTS

| | | | |
|---|---|---|---|
| 5,418,913 A | 5/1995 | Fujimoto | |
| 6,047,339 A | 4/2000 | Su et al. | |
| 6,055,597 A | 4/2000 | Houg | |
| 6,092,140 A | 7/2000 | Tausheck | |
| 6,134,619 A | 10/2000 | Futral et al. | |
| 6,411,301 B1 | 6/2002 | Parikh et al. | |
| 6,501,480 B1 | 12/2002 | MacInnis et al. | |
| 2003/0222877 A1 | 12/2003 | Tanaka et al. | |

OTHER PUBLICATIONS

PCT International Preliminary Search Report mailed Oct. 4, 2006; 7 pgs.

*Primary Examiner* — William M Treat
(74) *Attorney, Agent, or Firm* — Dicke, Billig & Czaja, PLLC (57) ABSTRACT

One aspect relates to a computer system including a first data processing unit, a second data processing unit and a data transmission/memory device. The data transmission/memory can transmit sets of data from the first data processing unit to the second data processing unit. The data transmission/memory device includes a first memory region and a second memory region.

16 Claims, 6 Drawing Sheets

COMPUTER SYSTEM FOR ELECTRONIC DATA PROCESSING

CROSS-REFERENCE TO RELATED APPLICATIONS

This Utility patent application claims the benefit of the filing date of Application Number DE 10 2004 012 516.3, filed Mar. 15, 2004 and International Application No. PCT/DE2005/000430, filed Mar. 10, 2005, all of which are herein incorporated by reference.

BACKGROUND

One aspect relates to a computer system for electronic data processing having a first data processing unit and a second data processing unit.

In addition to a central data processing unit in the form of a microprocessor, modern computer system frequently have a further data processing unit which is usually referred to as a coprocessor.

In contrast to the central data processing unit, which will be referred to below as a standard processor, a coprocessor is typically specialized for specific computational tasks.

Owing to its specialization for specific tasks, the coprocessor is typically able to execute certain computer program instructions faster than the standard processor.

What is understood here by faster execution of an instruction is that the instruction is executed by the coprocessor within fewer standard processor clock cycles than are required for its execution if the standard processor executes the instruction itself.

For example, many modern personal computers have a graphics card with a separate graphics coprocessor. Owing to its specialization for graphics calculations, said graphics coprocessor is able to execute computationally intensive graphics calculations, for example calculations of light effects in a 3D landscape, much faster than the standard processor of the personal computer.

A coprocessor specialized for specific tasks can thus be suitable for relieving the load on the standard processor where applications have tasks for which the coprocessor is specialized.

The specialization of coprocessors results in less flexibility in comparison with the standard processor. Coprocessors are typically not capable of autonomously executing complete computer programs, but are supplied with instructions and with data required for executing said instructions by a standard processor. This means that the standard processor typically transfers to the coprocessor a data record containing a specification of the instruction to be executed itself plus a specification of the data required for executing the instruction.

For example, a standard processor transfers to an associated coprocessor a data record containing a bit code that specifies the instruction "Add two data elements", which data record additionally contains two memory addresses that address two memory cells of a computer data memory in which the data elements to be added are stored.

Said specification of the instruction and the specification of the data required for executing the instruction are referred to below as the instruction parameters of the instruction or as the (instruction) parameters required for an instruction.

The number of parameters required for different instructions varies. Likewise, the memory requirement for the parameters required for different instructions varies.

Many computer systems have for example a floating-point processor, that is to say a coprocessor which is specialized for performing floating-point operations. Such a coprocessor of a computer system is supplied by the standard processor of the computer system with instructions for which few instruction parameters are required.

The reason for this is that the data processed during the operations associated with said instructions contains only individual floating-point values or small vectors with few (for example, four) floating-point components. Consequently only a small amount of data is processed in the case of such instructions, which is why only a few parameters are required to specify this data. Owing to the low number of parameters required, the memory requirement for the parameters is also low.

As floating-point instructions can typically be specified using a few bits, likewise only few parameters with a low memory requirement are required to specify an instruction itself with which the floating-point processor is supplied.

This case, in which the parameters which have a low memory requirement for the instructions that are supplied to a coprocessor by a standard processor, for example because of the low number of parameters, will be referred to below as a tight coupling of the standard processor and the coprocessor.

With such a tight coupling, the coprocessor typically requires only few standard processor clock cycles for executing an instruction supplied to it by the standard processor.

In the case of a so-called loose coupling of a standard processor and a coprocessor, in each case a larger number of parameters with a higher memory requirement are required for the instructions that the standard processor supplies to the coprocessor than in the case of tight coupling of the two processors.

Loosely coupled processors as defined here process more complex tasks than tightly coupled processors, for the processing of which tasks the loosely coupled processors typically require a large number of standard processor clock cycles.

For example, graphics coprocessors execute instructions for which a large number of parameters are required. Up to 30 parameters may be required to specify the corners of a 3D object to be represented, the texture or the lighting of the 3D object for example. A long period of time, that is to say many standard processor clock cycles, is required for executing complex graphics instructions. During the period of time in which the coprocessor is executing a graphics instruction, the standard processor can execute other instructions.

In order for the coprocessor to be able to execute an instruction, the standard processor must transfer to the coprocessor the parameters required for the instruction which specify the instruction itself plus the data required for executing the instruction.

In the case of a loose coupling of standard processor and coprocessor, owing to the high memory requirement for the parameters to be transferred, this communication can entail a lengthy time requirement, that is to say a large number of standard processor clock cycles in which the standard processor is occupied with communication.

The data processing of a standard processor and of an associated coprocessor, that is to say of a coprocessor which the standard processor supplies with instructions, is typically asynchronous. This means that the coprocessor does not immediately commence executing an instruction transferred by the standard processor as soon as the data required is transmitted. For example, the standard processor can transfer the instruction parameters required for an instruction to the coprocessor even while the latter is still executing another instruction.

This has the advantage, for example, that the standard processor does not have to wait until the coprocessor is ready for the transmission, but can transmit the parameters required for an instruction and subsequently immediately execute further instructions.

Owing to the asynchronous cooperation of standard processor and coprocessor, memories are required for the data transmission between standard processor and coprocessor, that is to say for the transfer of parameters required for instructions, since said data must be stored if it is not immediately processed by the coprocessor.

For the data transmission between a standard processor and a coprocessor, it is known to use a memory in which the standard processor can store data and from which the coprocessor can read data.

With this arrangement, the standard processor stores the parameters required for an instruction to be executed in the memory. The specification of the instruction itself and the specification of the data required for executing the instruction can be performed separately here, for example the coprocessor may have a special register and the standard processor stores the parameters that specify the data required for executing the instruction in the memory and requests the coprocessor to execute the instruction by storing the parameters that specify the instruction in the special register of the coprocessor.

Alternatively, the standard processor may store all instruction parameters required in the memory.

The coprocessor executes the instruction by accessing the parameters stored in the memory or additionally in the special register.

With this arrangement, the standard processor must wait with storing the instruction parameters until the coprocessor no longer requires the instruction parameters previously stored in the memory. Otherwise the standard processor overwrites instruction parameters that are still required, which can lead to incorrect execution of one of the instructions executed by the coprocessor.

Since the coprocessor typically no longer requires the instruction parameters only once it has executed the respective instruction, the standard processor must wait with the transmission of instruction parameters required for an instruction until the coprocessor is not currently executing an instruction, that is to say in particular until the coprocessor has completed execution of the instruction preceding the instruction for which instruction parameters are to be transmitted.

Since in this case the standard processor cannot transfer any data to the coprocessor when the latter is executing an instruction, the end effect for processing an instruction is that the total of the time required for transferring the instruction parameters and the time required for the actual execution of the instruction by the coprocessor is required, since the coprocessor must initially wait for the transfer of the instruction parameters required for an instruction, cannot execute any other instruction during this time, and subsequently must execute the instruction.

In the prior art this disadvantage, as a result of which a significant advantage of the cooperation of standard processor and coprocessor is lost, is countered by the use of an alternate buffer or a first-in-first-out (FIFO) memory.

An alternate buffer has two memory regions. The standard processor of a computer system writes instruction parameters for example into the first memory region of an alternate buffer. Once storing the instruction parameters has been completed, the coprocessor of the computer system can read out the instruction parameters from the first memory region and execute the respective instruction.

The standard processor does not need to wait until the coprocessor has completed execution of said first instruction, but can meanwhile store the instruction parameters required for a second instruction in the second memory region. Once the standard processor has completed storing the instruction parameters required for the second instruction and the coprocessor has completed executing the first instruction, by accessing the second memory region of the alternate buffer, the coprocessor can execute the second instruction while the standard processor writes the parameters required for a third instruction into the first memory region, and so forth.

The use of a FIFO memory follows a similar principle. At one end of the FIFO memory the standard processor of a computer system stores the instruction parameters required for executing an instruction, while at the other end of the FIFO memory the coprocessor of the computer system reads out the instruction parameters and executes the respective instructions.

As a consequence, as with the use of an alternate buffer, it is possible for the data transfer from the standard processor to the coprocessor and the execution of instructions by the coprocessor to overlap.

Compared with the use of a simple memory, this enables a faster processing speed of the instructions to be processed to be achieved.

However, the use of an alternate buffer or of a FIFO memory has the disadvantage that the instruction parameters of two successive instructions are written into two different memory regions. As a result, the standard processor must always write the entire instruction parameter set into the respective memory region, even if the instruction parameters of two successive instructions differ only very slightly.

In the field of software, and especially for the communication of program parts, it is customary to pass only changing parameters from one program part to another and not to pass parameters that remain constant a second time.

For example, the OpenGL graphics library operates as a "state machine". If, for example as a result of an OpenGL function call, the color is set to a specific value, for instance by the command glcolor3f(1.0,1.0,1.0);

by means of which the color in which the objects are drawn is set to white, then all objects that are drawn by function calls following this command are drawn in white until the color in which objects are drawn is changed by a further glcolor command.

If a program that uses the OpenGL graphics library is executed on a typical conventional computer system having a graphics coprocessor, for example an IBM-compatible personal computer (PC) with a graphics card having a graphics processor, then all instruction parameters required for executing an instruction are always transferred. If the graphics coprocessor is to represent, for example, two white triangles on a screen, then the standard processor transfers to the graphics processor two corresponding instructions with the respective instruction parameters, with the instruction parameters transferred for each of the two instructions containing the specification of the color as "white".

On the software level on the other hand it is sufficient to specify the color as "white" only once using a suitable function call.

Since in the case of a computer system in which an alternate buffer or a FIFO memory according to the prior art is used for the data transmission from a standard processor to a coprocessor, all instruction parameters must always be transferred from the standard processor, even the ones that have not changed, the transmission of data between the standard processor and the coprocessor can require a considerable amount of time.

Especially in the case of the loose coupling of processors, as described above, the transmission of a large number of instruction parameters with a high memory requirement is required for executing an instruction. Owing to the large volume of data, a high communications outlay is also necessary for transmission of this data. The standard processor stores the instruction parameters in a FIFO memory for example. If the volume of data is very high, the standard processor requires many clock cycles for the transmission.

This can have a considerable adverse affect on the processing performance of the computer system. For example, if the standard processor requires more time for transmitting the instruction parameters required for an instruction than the coprocessor requires for the execution of the instruction preceding said instruction, then the coprocessor is inactive until the transmission is completed. The processing performance of the computer system is thus less than it theoretically could be, that is if both processors were continuously executing instructions.

While the standard processor is transmitting data to the coprocessor, the processing performance of the standard processor available for executing other instructions is limited. In particular when a large volume of data is to be transmitted, it is consequently of great importance for the processing performance of the computer system that the data is transmitted efficiently.

In extreme cases, the standard processor requires even longer for the transmission of the parameters required for an instruction than the standard processor requires for executing the instruction. In this case it is actually more efficient, that is to say less time is required for processing the instruction, if the standard processor does not pass the instruction on to the coprocessor but executes it itself.

U.S. Pat. No. 6,411,301 B1 discloses an architecture for a computer system having a main processor and a graphics processor. In this arrangement the main processor can store graphics commands in a main memory. The graphics processor can read said commands out of the main memory, wherein the graphics commands can be buffered by means of a FIFO buffer arranged between the main memory and the graphics processor.

In US 2003/0222877 A1 a processor is disclosed which has an intermediate memory (cache). The intermediate memory is connected to a coprocessor and the coprocessor can store results in the intermediate memory.

U.S. Pat. No. 6,501,480 B1 discloses a graphics accelerator having a local memory, a coprocessor and a DMA (Direct Memory Access) unit which is used for data transmission between the local memory and an external memory.

SUMMARY

One embodiment provides a device for data transmission from a first data processing unit to a second data processing unit in which the data transmission is more efficient than that of the prior art.

In one embodiment "more efficient" means that the standard processor uses on average fewer clock cycles to transmit data to be transmitted to the coprocessor than are used for data transmission from a standard processor to a coprocessor according to the prior art.

A computer system for electronic data processing is provided which has a first data processing unit, a second data processing unit and a data transmission memory device, wherein the data transmission memory device is connected on the input side to the first data processing unit and on the output side to the second data processing unit, and which data transmission memory device is set up to transmit data records from the first data processing unit to the second data processing unit, and wherein the data transmission memory device has a first memory region and a second memory region, wherein the first memory region and the second memory region are set up to store one data record in each case, and wherein the data transmission memory device is set up in such a way that the transmission of a data record to be transmitted from the first data processing unit to the second data processing unit is performed in accordance with the following steps: transferring to the first memory region and storing in the first memory region the data contained in the data record to be transmitted; copying the data record stored in the first memory region into the second memory region if copying is released; transferring the data record stored in the second memory region to the second data processing unit.

Since the data transmission memory device used according to one embodiment for the data transmission between the first data processing unit, which is in one embodiment a standard processor, and the second data processing unit, which is in one embodiment a coprocessor, has two memory regions, it is possible for the first data processing unit to perform a write access to the first memory region while the second data processing unit is accessing the second memory region.

In one embodiment, the first data processing unit is a standard processor and the second data processing unit is a coprocessor.

In one embodiment in which the first data processing unit is a standard processor and the second data processing unit is a coprocessor, this means in particular that the standard processor can write instruction parameters required for an instruction into the first memory region while the coprocessor is still executing an instruction preceding the instruction and is accessing the instruction parameters required for the preceding instruction which are stored in the second memory region.

As a consequence, it is possible in the computer system for the data transfer from the standard processor of the computer system to the coprocessor of the computer system and the execution of instructions by the coprocessor to overlap.

With this embodiment, for example, the standard processor does not have to wait until the coprocessor is ready for the transmission of data, but can write the parameters required for an instruction into the first memory region and subsequently immediately process further tasks.

There is therefore an efficiency conferred by the data transmission between the standard processor and the coprocessor in the computer system in comparison with a computer system which does not permit overlapping of the data transfer from the standard processor to the coprocessor and the execution of instructions by the coprocessor.

Moreover, with the computer system it is not always necessary to transmit a complete data record if data that it contains has already been previously transmitted, provided that said data is still contained in the data record stored in the first memory region.

In one embodiment in which the first data processing unit is a standard processor and the second data processing unit is a coprocessor, this means in particular that the standard processor need only transfer to the first memory region the instruction parameters required for an instruction which differ from the instruction parameters required for the instruction preceding the instruction.

If, for example, two instructions whose instruction parameters required differ only slightly in each case are to be successively executed by the coprocessor, the standard processor need transfer to the first memory region the complete instruction parameter set only for the instruction to be executed first, and for the instruction to be executed second need only transmit to the first memory region the instruction parameters which differ from the instruction parameters required for the first instruction.

The computer system thus confers a considerable efficiency over a computer system in which an alternate buffer or a FIFO memory is used, as in this case, as described above, the complete instruction parameter set must always be transmitted from the standard processor to the alternate buffer or to the FIFO memory, and consequently the volume of data to be transmitted is greater than with the computer system described above.

In one embodiment, the first data processing unit does not transmit the instruction parameters required for a single (program) instruction to the second data processing unit, but rather the instruction parameters required for a plurality of instructions are transmitted during a transmission operation to the second data processing unit, which executes the plurality of program instructions once the transmission has been completed.

This exemplary embodiment corresponds to a loose coupling of the first data processing unit and the second data processing unit. Since in this case a large volume of data is to be transmitted, efficient data transmission is important.

In a further embodiment, the data transmission memory device has a special memory, a so-called parameter memory (parameter RAM), by means of which the copying of a data record from the first memory region into the second memory region can be executed in one clock cycle. Since during the copying operation it is neither possible for the standard processor to write to the first memory region nor for the coprocessor to execute an instruction, this embodiment is used in one example.

For example, the information as to whether the second data processing unit is ready for data transmission is transferred to the data transmission memory device and, based on the information as to whether the second data processing unit is ready for data transmission, the decision is made as to whether copying is released.

With the computer system provided, in one example if copying is released if no data is transferred from the second memory region to the second data processing unit.

With the computer system provided, in one example, in the step of transferring to the first memory region and storing in the first memory region the data contained in the data record to be transmitted, only data which is not contained in the data record stored in the first memory region is transmitted.

In the computer system provided, in one example the first data processing unit is a standard processor and the second data processing unit is a coprocessor, and the data to be transmitted by means of the data transmission memory device is required for the execution of a program instruction by the coprocessor.

According to one embodiment of the computer system provided, the first memory region is a first memory bank and the second memory region is a second memory bank, and data can be transmitted from the first memory bank into the second memory bank by means of a transfer bus.

According to one embodiment of the computer system provided, the first data processing unit is connected by means of a system bus to the first memory bank, and the abovementioned transfer bus has a greater bandwidth than the system bus.

In the computer system provided, in one example, the data transmission memory device has a plurality of memory cells having a first memory element and a second memory element in each case, wherein each memory element is set up to store a single bit and wherein, when the data record stored in the first memory region is copied into the second memory region, the bit stored in the respective first memory element of a memory cell is copied into the respective second memory element of the memory cell.

In the computer system provided, in one example both memory regions are situated on one memory chip.

In the computer system provided, the coprocessor may be a graphics, image processing or mathematical coprocessor.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
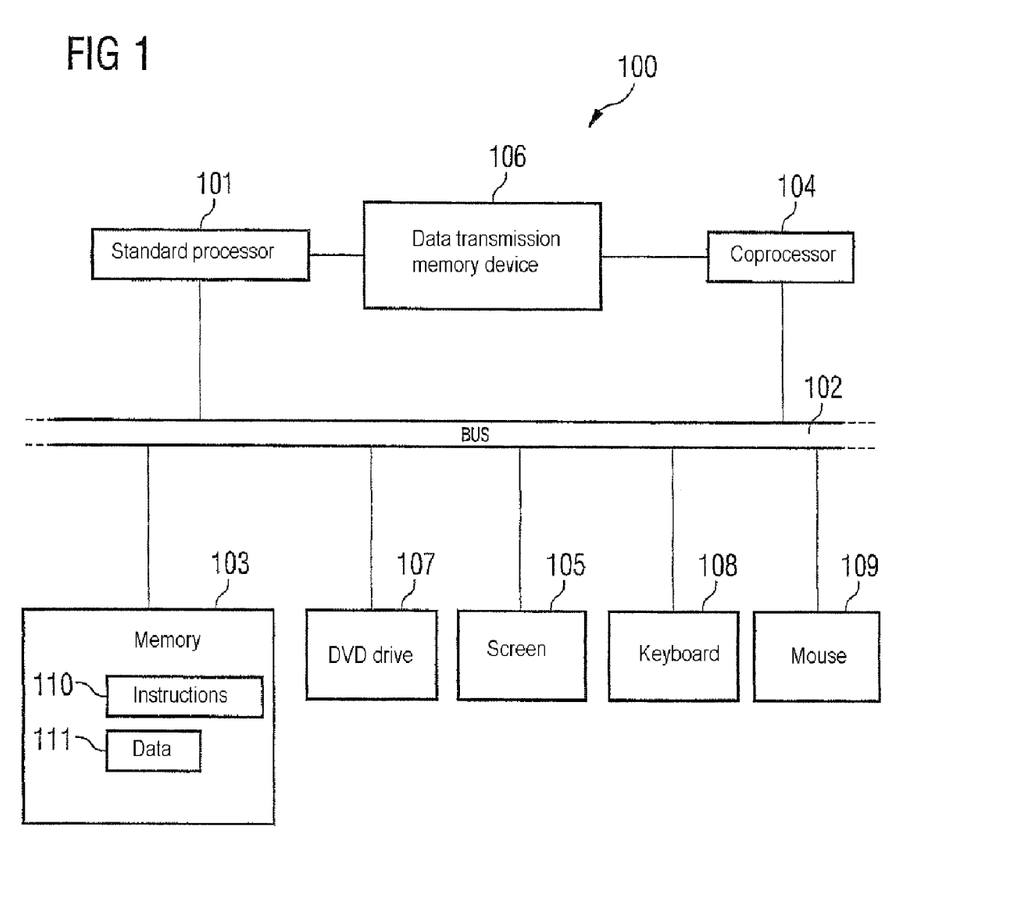
FIG. 1 illustrates a computer system according to a first exemplary embodiment.

FIG. 1 illustrates a computer system 100 according to a first exemplary embodiment.

The computer system 100 has a standard processor 101, a computer bus 102 and a memory 103.

The standard processor 101 is connected by means of the computer bus 102 to the memory 103 and accesses the memory 103 by means of the computer bus 102. The memory 103 contains instructions 110 of a computer program and data 111 required for executing the instructions. When the computer program stored in the memory 103 is executed, the program instructions 110 are transferred to the standard processor 101 by means of the computer bus 102. The standard processor either executes a program instruction transferred from the memory 103 itself, or it decides, based on the characteristics of the program instruction, that a coprocessor 104 should execute the instruction.

For example, the program instruction currently to be processed is an instruction for displaying a triangle on a screen 105 and the coprocessor 104 is a graphics coprocessor. In this example the standard processor 101 decides that the graphics coprocessor 104 should execute the instruction.

The reason for this decision may be
- that the coprocessor 104 is a processor specialized for program instructions of the type of program instruction to be processed and can therefore execute the program instruction faster than the standard processor 101,
- that the standard processor 101 is not suitable for executing the program instruction because it does not have the required instruction set available, or
- that although the standard processor 101 can execute the instruction as fast as or faster than the coprocessor 104, it nevertheless passes it to the coprocessor 104 for execution to relieve the load on the standard processor 101.

If the standard processor 101 decides that the coprocessor 104 should execute a program instruction, then the parameters required for executing the instruction are transferred by means of a data transmission memory device 106.

The parameters required for executing an instruction are all information that the coprocessor 104 requires to execute the instruction. Typically this is a specification of the instruction itself plus a specification of the data elements required during execution of the instruction, or other information such as a memory address at which the result of the instruction is to be stored for example.

For example, the parameters required for executing an instruction have a data word containing the instruction "Add the two data elements located at a first address and a second address in the memory and store the result at a memory location in the memory specified by a third address".

In addition to this specification of the instruction to be executed itself, in this case the parameters required for executing the instruction have the first address and second address that specify the data elements required for executing the instruction, namely the memory addresses that indicate where the data elements are stored in the memory.

In this example, the parameters required for executing the instruction also have the address indicating the memory location at which the result of the addition is to be stored.

The parameters required for executing an instruction will now be referred to below simply as "instruction parameters".

Embodiments of the data transmission memory device 106 and an embodiment of the sequence of transfer of the instruction parameters required for an instruction from a standard processor to a coprocessor by means of an embodiment of the data transmission memory device will be described further below.

Like the standard processor 101, the coprocessor 104 is also connected to the computer bus 102. If the coprocessor 104 is, for example, a graphics coprocessor connected to the screen 105, control signals that control the screen 105 in such a way that the screen 105 displays a desired graphical representation, for example a triangle, may be transferred from the coprocessor 104 to the screen 105.

In addition, the coupling of the standard processor 101 and the coprocessor 104 by means of the computer bus 102 enables the transmission of signals between the standard processor 101 and the coprocessor 104.

In one embodiment, the coprocessor 104 transfers for example a signal containing the information that the coprocessor 104 has completed a specific instruction to the standard processor 101.

For example, the coprocessor 104 has executed a calculation instruction and stored the result of the execution of the calculation instruction at a memory address specified for the parameters required for executing the instruction in the memory 103. Once the coprocessor 104 has signaled completion of the execution of the calculation instruction to the standard processor 101 by means of the computer bus 102, it can access the result stored in the memory 103.

In one embodiment, the instruction parameters required for executing an instruction are not all transmitted by means of the data transmission memory device 106.

For example, the instruction parameters that specify the instruction itself are transmitted by means of the computer bus 102 and stored in a local instruction memory of the coprocessor 102.

In one embodiment, the majority of instruction parameters are transmitted by means of the data transmission memory device 106.

The computer system 100 has additional conventional devices. In this embodiment, a digital versatile disk (DVD) drive 107, a keyboard 108 and a computer mouse 109 are connected to the computer bus 102.

Figure 2:
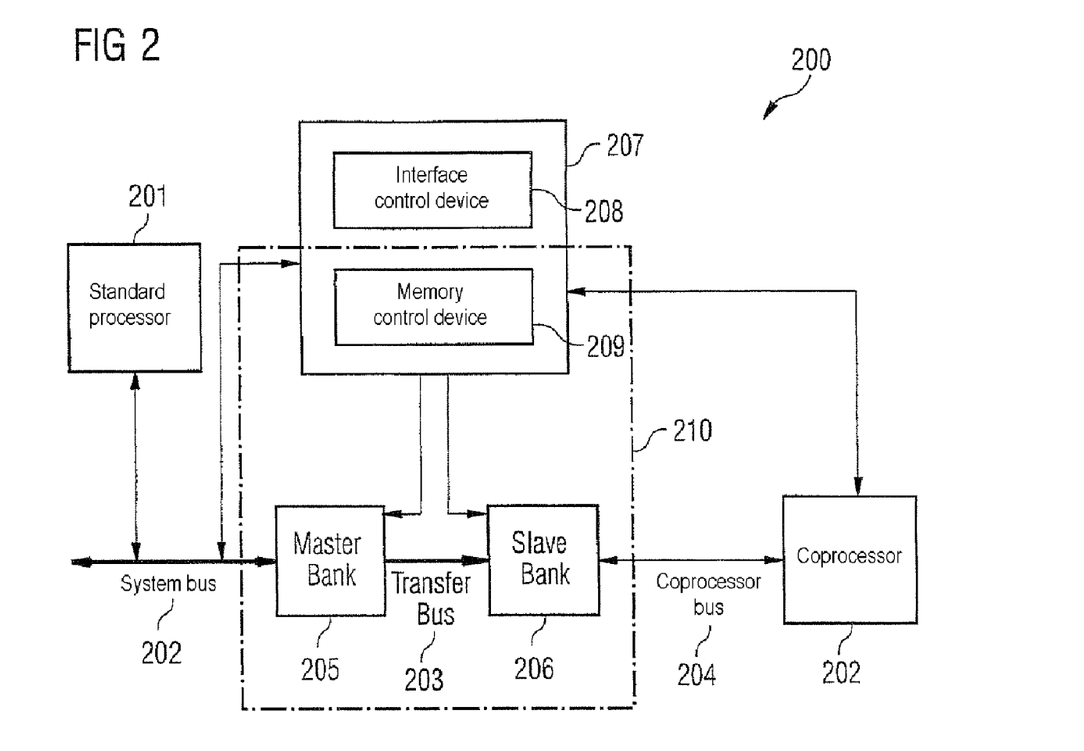
FIG. 2 illustrates a computer system according to a second exemplary embodiment.

FIG. 2 illustrates a computer system 200 according to a second exemplary embodiment.

The computer system 200 has a standard processor 201 and a coprocessor 202.

The computer system according to this exemplary embodiment has a plurality of devices that serve for communication between the standard processor 201 and the coprocessor 202: a first memory bank (master bank) 205, a second memory bank (slave bank) 206 and a control device 207.

The control device 207 has an interface control device 208 and a memory control device 209.

In this embodiment, the interface control device 208 and the memory control device 209 are not separate devices, but together form the control device 207.

In this embodiment the master bank 205 and the slave bank 206 are conventional dual port memory modules, that is to say memory modules having two ports in each case by means of which read and/or write access to the memory modules is possible.

The computer system 200 further has a plurality of computer buses: a system bus 202, a transfer bus 203 and a coprocessor bus 204.

The system bus 202 connects the master bank 205, the standard processor 201, the control device 207 and other devices, not represented, such as a computer memory and input and output devices.

The transfer bus 203 enables data transmission from the master bank 205 to the slave bank 206.

The coprocessor bus 204 enables the coprocessor 202 to access the slave bank 206.

In this embodiment, the master bank 205, the slave bank 206 and the memory control device 209, which is designed together with the interface device 208 in the form of the control device 207, and the transfer bus 203 form the data transmission memory device 210 according to one embodiment, which is represented in FIG. 2 by the dotted rectangle.

The standard processor 201 and the coprocessor 202 can communicate with each other on a first data transmission path by means of the system bus 202, the master bank 205, the transfer bus 203, the slave bank 206 and the coprocessor bus 204, and on a second data transmission path by means of the system bus 202 and the control device 207.

However, the transfer bus 203 enables only data transmission from the master bank 205 to the slave bank 206 and not vice versa.

The sequence of data transmission between the standard processor 201 and the coprocessor 202, specifically the instruction parameters required for an instruction, will be explained below with reference to FIG. 2 and FIG. 3.

Figure 3:
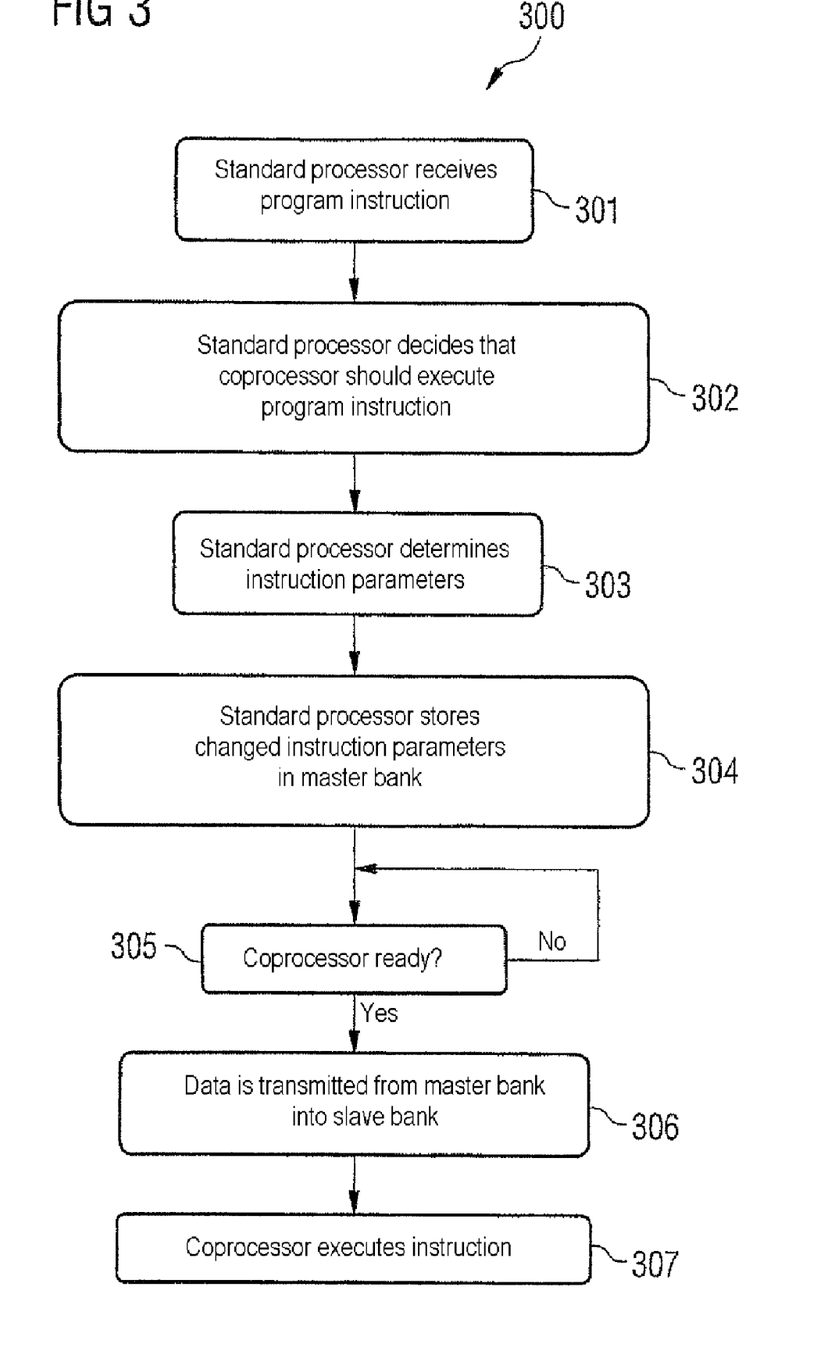
FIG. 3 illustrates a flowchart of the processing of an instruction by means of the computer system illustrated in FIG. 2.

FIG. 3 illustrates a flowchart 300 of the processing of an instruction by means of the computer system illustrated in FIG. 2.

In step 301 the standard processor 201 receives a program instruction of a computer program being processed by the computer system 200. The standard processor 201 receives said program instruction for example by accessing a program memory, not illustrated in FIG. 2, by means of the system bus 202.

In step 302 the standard processor 201 decides, based on the type of program instruction, whether the standard processor itself or the coprocessor 202 should execute the instruction.

In this example it is assumed that it is decided that the coprocessor 202 should execute the (program) instruction.

In this example it is further assumed for the better understanding that the current instruction, that is to say the program instruction received from the standard processor 201 in step 301, is not the first instruction of the computer program processed by the computer system 200 where it is decided that it should be executed by the coprocessor 202.

In particular it is assumed that the instruction parameters required for an instruction preceding the current instruction have been transferred to the coprocessor 202 by means of the master bank 205 and the slave bank 206.

In step 303 the standard processor 201 determines the instruction parameters required for executing the instruction.

It can determine this for example by accessing a memory, not illustrated in FIG. 2.

In step 304 the standard processor 201 transfers the instruction parameters by means of the system bus 202 to the master bank 205 in which the instruction parameters are stored.

According to one embodiment, only the changed instruction parameters are transferred and stored here, that is to say the instruction parameters that differ from the parameters required for the preceding instruction executed by the coprocessor 202.

According to one embodiment, following their transfer to the coprocessor 202 by means of the master bank 205 and the slave bank 206, the instruction parameters required for the preceding instruction are not deleted. Said instruction parameters are thus still stored in the master bank 205 at the beginning of step 304. In step 304 the standard processor transfers to the master bank 205 only the instruction parameters required for the current instruction which differ from the parameters required for the preceding instruction.

In one embodiment, the standard processor 201 itself checks which instruction parameters differ from the instruction parameters stored in the master bank 205.

For example, the computer program can be executed using a hardware driver which is set up to control the standard processor 201 in such a way that it checks which instruction parameters differ from the instruction parameters stored in the master bank 205.

Once the instruction parameters have been transferred, the standard processor 201 transfers the information that it has completed the transfer of a set of instruction parameters for an instruction to the control device 207.

In step 305 the interface control device 208 of the control device 207 checks whether the coprocessor 202 is ready to execute a new instruction.

In this manner it is checked whether the coprocessor 202 is accessing the slave bank 206 by means of the coprocessor bus 204.

The sequence does not continue with the next step 306 until the information that the coprocessor 202 is ready is present.

In step 306 the data stored in the master bank 205 is transmitted into the slave bank 206 by means of the transfer bus 203.

The memory control device 209 of the control device 207 receives from the interface control device 208 of the control device 207 the information that the coprocessor 202 is ready, as tested in step 305.

Since the coprocessor 202 therefore no longer requires the data stored in the slave bank 206, because it has completed executing the last instruction, the data can be overwritten.

The memory control device 209 of the control device 207 controls the copying operation of the data from the master bank 205 into the slave bank 206.

In one embodiment, the transfer bus 203 has a wide bandwidth because in this case the copying operation can be executed in a few transfer bus clock cycles. During data transmission from the master bank 205 to the slave bank 206 by means of the transfer bus 203, neither the standard processor 201 can access the master bank 205, nor can the coprocessor 202 access the slave bank 206, that is to say in particular the coprocessor 202 cannot execute any instruction during the copying operation.

If, for example, 32 instruction parameters are required, with each of the parameters having a memory requirement of 32 bits, and if the transfer bus 203 has a bandwidth of 256 bits, then the instruction parameters can be transmitted in 4 clock cycles.

In one embodiment, the transfer bus 203 has a bandwidth that is at least five times greater than the system bus 202.

The bandwidth of the transfer bus 203 can be increased, for example by increasing the transfer bus clock rate or by increasing the number of data lines of the transfer bus 203.

Once the copying operation of the data from the master bank 205 into the slave bank 206 has been completed, the memory control device 209 of the control device 207 signals that the copying operation has been completed to the interface control device 208 of the control device 207.

The data contained in the master bank 205 is retained once the copying operation has been completed.

In step 307 the interface control device 208 of the control device 207 signals to the coprocessor 202 that it should commence executing the instruction.

The coprocessor 202 then executes the instruction, obtaining the instruction parameters required for this by accessing the slave bank 206.

In one embodiment, the instruction parameters required for executing an instruction are not all transmitted by means of the master bank 205 and the slave bank 206.

For example, the instruction parameters that specify the instruction itself are transmitted by means of the interface control device 208 of the control device 207 to the coprocessor 202.

Figure 4:
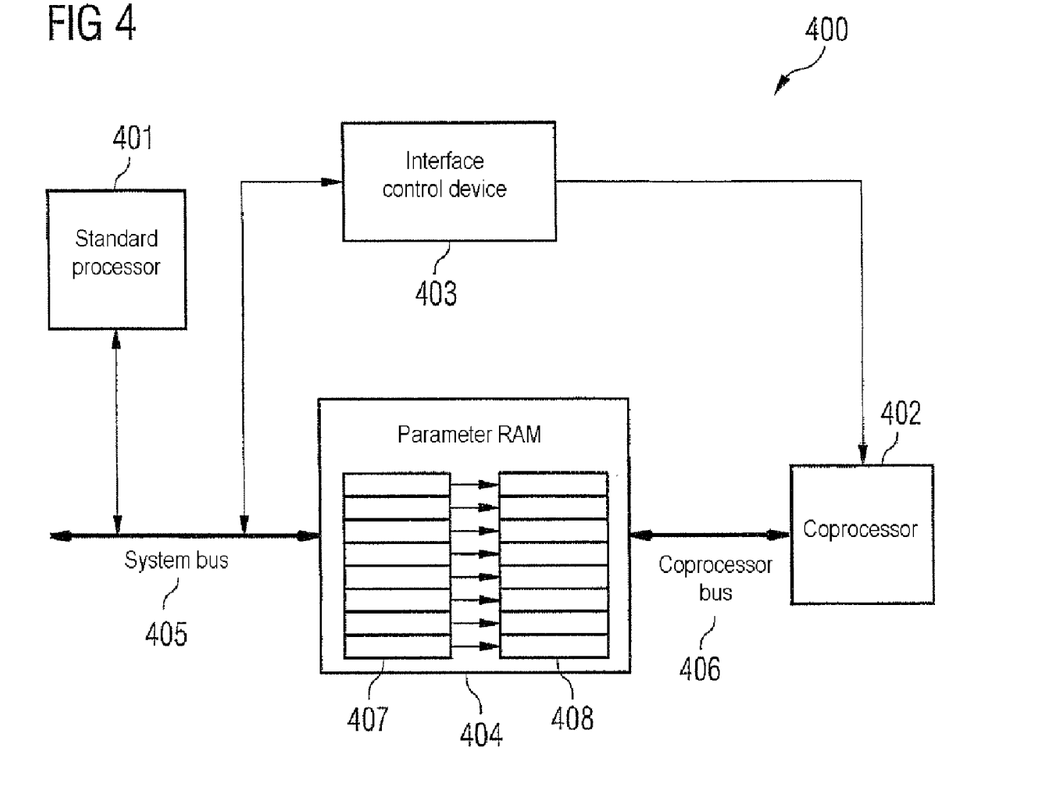
FIG. 4 illustrates a computer system according to a third exemplary embodiment which has a parameter memory.

FIG. 4 illustrates a computer system 400 according to a third exemplary embodiment, which has a parameter memory.

The computer system 400 has a standard processor 401 and a coprocessor 402.

The computer system 400 further has an interface control device 403 and a parameter memory (parameter RAM) 404 which is described in detail further below.

The parameter memory 404 has a first memory region 407 and a second memory region 408.

The parameter memory 404 may be designed in the form of a single memory chip.

The computer system 400 further has a system bus 405 and a coprocessor bus 406.

The system bus 405 connects the standard processor 401, the parameter memory 404, the interface control device 403 and further devices, not illustrated, of the computer system 400, for example a computer memory and input and output devices.

The coprocessor bus 406 connects the coprocessor 402 to the parameter memory 404.

The parameter memory 404 corresponds to the data transmission memory device according to one embodiment.

In contrast to the computer system 200 illustrated in FIG. 2, the computer system 400 has no memory control device 209.

The sequence of processing a computer program by means of the computer system 400 is analogous to the sequence of processing a computer program by means of the computer system 200 described with reference to FIG. 2 and FIG. 3.

The first memory region 407 corresponds to the master bank 205 and the second memory region 408 corresponds to the slave bank 206.

One difference between the sequence of processing a computer program by means of the computer system 400 and the sequence of processing a computer program by means of the computer system 200 is that the computer system 400 has no memory control device 209 that controls the copying operation between the first memory region 407 and the second memory region 408.

The sequence of controlling the copying of the instruction parameters from the first memory region 407 into the second memory region 408 will become clear from the description of the parameter memory 404 below.

Figure 5:
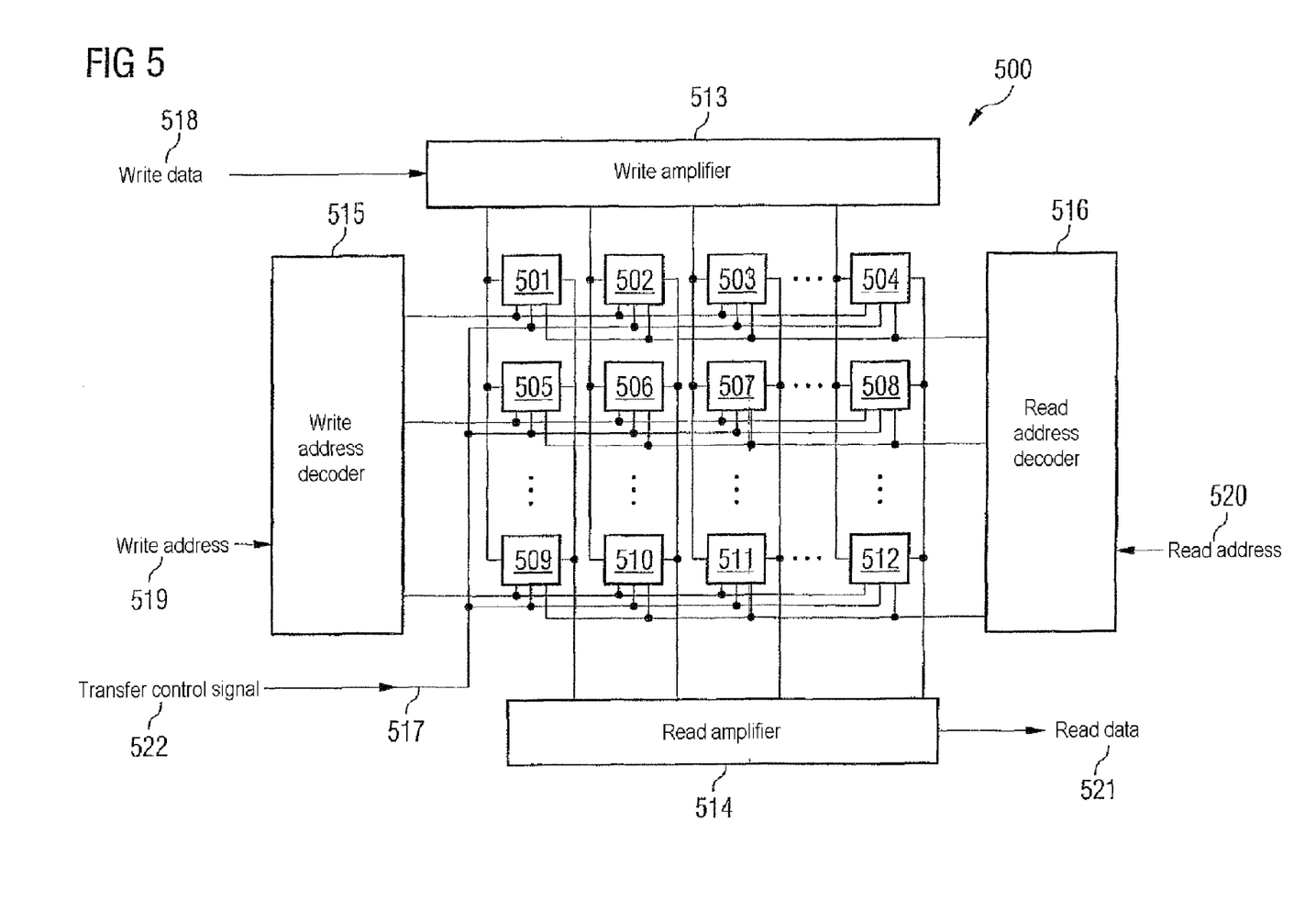
FIG. 5 illustrates the structure of the parameter memory from FIG. 4.

FIG. 5 illustrates the structure of the parameter memory 500 from FIG. 4.

The parameter memory 500 has a plurality of memory cells, of which twelve memory cells 501 to 512 are represented.

In this embodiment, the memory cells 501 to 512 are arranged in the form of a two-dimensional matrix having a plurality of (memory cell) rows and (memory cell) columns.

Each of the memory cells 501 to 512 is connected to a write amplifier 513, a read amplifier 514, a write address decoder 515, a read address decoder 516 and a transfer control signal line 517.

If write data 518 is to be written into the parameter memory 500, it is fed into the write amplifier 513 in the form of data words.

In this embodiment the data word has as many data bits as the parameter memory 500 has memory cell columns.

The data word is fed into the write amplifier 513 in the form of an electrical signal. Said electrical signal is electrically amplified by the write amplifier 513.

The write amplifier 513 has as many outputs as the data word has data bits. Each output of the write amplifier 513 corresponds to one data bit of the data word, and the data bit corresponding to an output is output to said output by the write amplifier 513.

A write address 519 specifies the row with memory cells of the parameter memory in which the data word 518 is to be stored. The write address 519 is fed into the write address decoder 515, which has an output for each of the memory cell rows of the parameter memory 500, and at the output corresponding to the memory cell row addressed by the write address 519, the write address decoder 515 outputs a binary one, and outputs a binary zero at the other outputs.

The operation during writing into the memory cells 501 to 512 will be described further below with reference to FIG. 6.

If data is to be read out of the parameter memory 500, a read address 520 that specifies the memory cell row of the parameter memory 500 from which data is to be read is fed into the read address decoder 516.

The read address 515 has an output for each of the memory cell rows of the parameter memory 500, and at the output corresponding to the memory cell row addressed by the read address 520, the read address decoder 515 outputs a binary one, and outputs a binary zero at the other outputs.

The memory cells of the memory cell row specified by the read address 520 then each output a data bit that is stored therein.

The exact functioning of the memory cells 501 to 512 will be described further below with reference to FIG. 6.

The data bits output from the memory cells of the memory cell row specified by the read address 520 are fed into the inputs of the read amplifier 514, the number of inputs of which is equal to the number of memory cell columns of the parameter memory 500.

The data bits are fed into the read amplifier 514 in the form of electrical signals and are amplified there and output as read data 521 in the form of data words.

By means of the transfer control signal line 517, a transfer control signal 522 can be fed into the memory cells 501 to 512 in the form of a single transfer control signal bit.

If the transfer control signal bit has the value binary one, then the copying operation according to one embodiment from the first memory region 407 into the second memory region 408 of the parameter memory 404 is executed.

This will be explained below with reference to FIG. 6.

Figure 6:
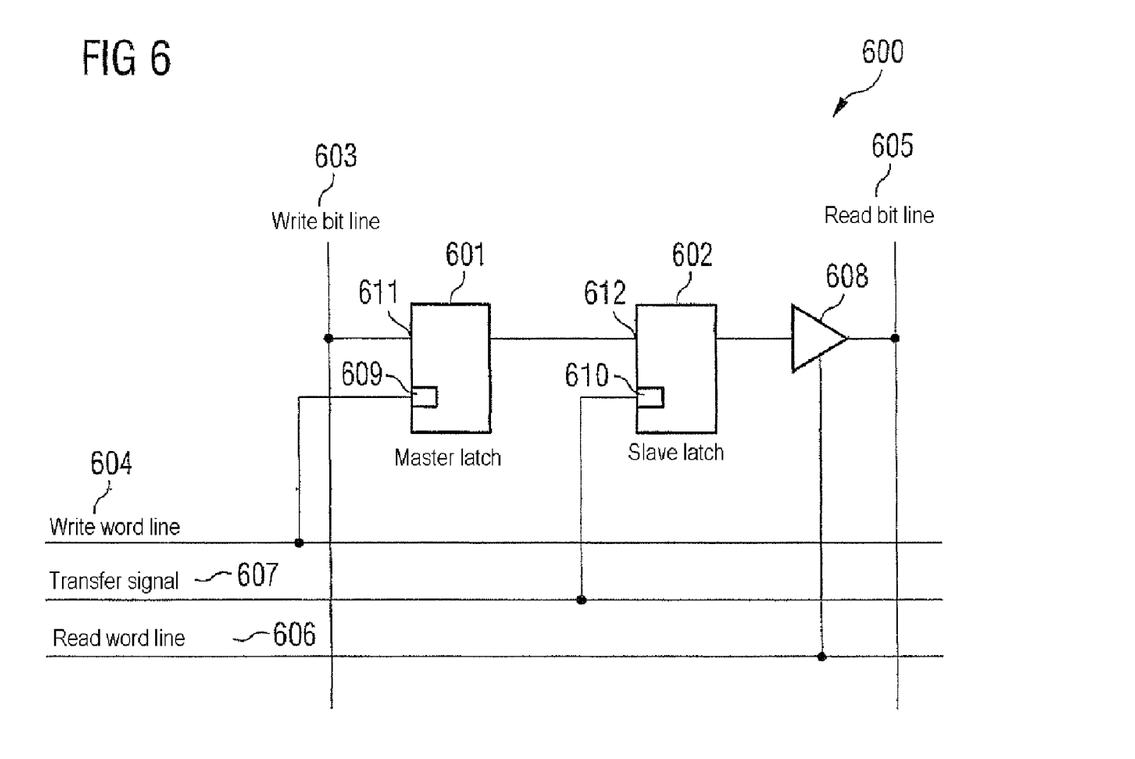
FIG. 6 illustrates the structure of a memory cell of the parameter memory from FIG. 4.

FIG. 6 illustrates the structure of one memory cell 600 of the memory cells 501 to 512 of the parameter memory 404 from FIG. 4.

The memory cell 600 has a first memory element (master latch) 601 and a second memory element (slave latch) 602.

Both memory elements 601, 602 are set up to store a single bit in each case.

The two memory elements 601, 602 further always output the value of the respective bit stored therein.

The totality of the first memory elements of the memory cells 501 to 512 of the parameter memory 404 form the first memory region 407 and the totality of the second memory elements of the memory cells 501 to 512 of the parameter memory 404 form the second memory region 408.

The memory cell 600 is connected by means of a write bit line 603 to the write amplifier 513, by means of a write word line 604 to the write address decoder 515, by means of a read bit line 605 to the read amplifier 514, and by means of a read word line 606 to the read address decoder 516.

A transfer signal 607 can further be fed into the second memory element 602.

The transfer signal 607 corresponds to the transfer control signal 522 described above and fed into the memory cells 501 to 512 by means of the transfer control signal line 517.

The transfer signal 607 accordingly has only a single bit.

The first memory element 601 has a control input 609 and the second memory element 602 has a control input 610.

If no transfer signal 607 is transmitted, the value zero is present at the control input 610.

The first memory element 601 has a data input 611 and the second memory element 602 has a data input 612.

If a bit having the value one is present at the control input 609, then the first memory element 601 stores the bit present at the data input 611 and the bit previously stored in the first memory element 601 is overwritten. If a bit having the value zero is present at the control input 609, then the bit stored in the first memory element 601 is retained and not overwritten by the bit present at the data input 611.

If a bit having the value one is present at the control input 610, then the second memory element 602 stores the bit present at the data input 612 and the bit previously stored in the second memory element 602 is overwritten. If a bit having the value zero is present at the control input 610, then the bit stored in the second memory element 602 is retained and not overwritten by the bit present at the data input 612.

As described above, in the case of a write access a data bit is transmitted from the write amplifier 513 by means of the write bit line 603.

If the memory cell 600 is in the row of the parameter memory 500 specified by the write address 519, then, as described above, a bit having the value one is transferred by means of the write word line 604 from the write address decoder 515 to the first memory element 601.

In this case a bit having the value one is present at the control input 609. The first memory element 601 therefore stores the data bit present at the data input 611 which was transferred by means of the write bit line 603.

If the memory cell 600 is not in the row of the parameter memory 500 specified by the write address 519, then, as described above, a bit having the value zero is transferred by means of the write word line 604 from the write address decoder 515 to the first memory element 601.

In this case a bit having the value zero is present at the control input 609. The first memory element 601 therefore does not store the data bit present at the data input 611 which was transferred by means of the write bit line 603.

Analogously to the processing of an instruction by means of the computer system 200 illustrated in FIG. 2 which was described with reference to FIG. 3, during processing of an instruction by means of the computer system 400 having a parameter memory 404 as illustrated by FIG. 5 and FIG. 6, the parameters required for the instruction are transmitted to the data transmission memory device, which corresponds to the parameter memory 404 in the computer system 400 illustrated in FIG. 4, and are stored there.

Once said transmission and storage operation in the computer system 400 has been completed, the interface device 403 checks whether the coprocessor 402 is still accessing data stored in the second memory region 408 or is ready for the execution of the instruction and the copying operation of the data of the first memory region 407 into the second memory region 408.

If the coprocessor 402 is ready, a transfer signal 607 is sent by means of the interface device 403 to the parameter memory 404, which signal activates the copying operation of the data of the first memory region 407 into the second memory region 408 in the manner described below.

The transfer signal 607 is a signal having a bit with the value one. Said bit having the value one is present at the control input 610 of the second memory element 602. As a consequence, the value stored in the first memory element 601 which is present at the data input 612 is stored in the second memory element 602.

The transfer of a transfer signal 607, which is a signal having a bit with the value one, thus activates the copying of the data stored in the first memory region 407 into the second memory region 408.

According to this embodiment, only one clock cycle is required for the copying operation.

Once the copying operation is complete, analogously to the processing described with reference to FIG. 3, a signal is transferred to the coprocessor 402 by means of the interface control device 403, which signal instructs the coprocessor 402 to execute the instruction using the data stored in the second memory region 408.

This mode of functioning of the memory cell 600 during a read access of the coprocessor 402 to the second memory region 408 will be described below.

If the memory cell 600 is in the row of the parameter memory 500 specified by the read address 520, then, as described above, a bit having the value one is transferred by means of the read word line 604 from the read address decoder 515 to a tri-state driver 608.

In this case the value one is present at the control input of the tri-state driver 608. The tri-state driver 608 thus outputs the value present at its data input, that is to say the value of the bit stored in the second memory element 602.

If the memory cell 600 is not in the row of the parameter memory 500 specified by the read address 520, then, as described above, a bit having the value zero is transferred by means of the read word line 604 from the read address decoder 515 to the tri-state driver 608.

In this case the value zero is present at the control input of the tri-state driver 608. The tri-state driver thus assumes a high-resistance output state.

During a read access, the read bit line 605 therefore has the value that is stored in the second memory element 602 of the memory cell 600 corresponding to the read bit line 605 in the memory cell row addressed by the read address 520.

In this embodiment, the coupling of the first memory element 601 and the second memory element 602 within the memory cell 600 replaces a transfer bus such as the computer system 200 illustrated in FIG. 2 has for example.

By means of this local, direct one-to-one coupling of the first memory element 601 and the second memory element 602 within a memory cell, the data is transmitted from the first memory region 407 into the second memory region 408 locally within the memory cell 600.

The memory cell 600 thus has a local transfer bus, with the result that a further transfer bus between the first memory region 407 and the second memory region 408 is not required, and in the copying operation between the first memory region 407 and the second memory region 408 can be performed in one clock cycle.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A computer system comprising:
   a first data processing unit;
   a second data processing unit;
   a data transmission memory device providing parameter transmission from the first data processing unit to the second data processing unit, the data transmission memory device comprising:
      a first memory region with a set of records; and
      a second memory region with a set of records correlated with the first memory region's set of records;
   wherein a records transmission process comprises:
      determining when the first memory region is available to be overwritten with subsequent data;
      determining which records in a subsequent record set differ from a current record set stored in the first memory region;
      overwriting a current-record in the current record set if it is determined that the current record's counterpart in the subsequent record set is different than the current record;
      determining when the second data processing unit is ready to process a new set of records; and
      copying the parameter set in the first memory region into the second memory region.

2. The computer system of claim 1, wherein the first data processing unit is a standard processor and the second data processing unit is a coprocessor, and the parameter transmission process is required for the execution of a program instruction by the coprocessor.

3. The computer system of claim 1, wherein the first memory region is a first memory bank and the second memory region is a second memory bank, and data is transmitted from the first memory bank into the second memory bank by means of a transfer bus.

4. The computer system of claim 3, wherein the first data processing unit is connected by means of a system bus to the first memory bank, and the transfer bus has a greater bandwidth than the system bus.

5. The computer system of claim 1, wherein the data transmission memory device has a plurality of memory cells having a first memory element and a second memory element in each case, wherein each memory element is configured to store a single bit and wherein, when the data record stored in the first memory region is copied into the second memory region, the bit stored in the respective first memory element of a memory cell is copied into the respective second memory element of the memory cell by means of a local coupling.

6. The computer system of claim 1, wherein both memory regions are situated on one memory chip.

7. The computer system of claim 1, wherein the coprocessor is a graphics, image processing or mathematical coprocessor.

8. A method for processing data comprising:
   configuring a data transmission memory device to transmit data records from a first data processing unit to a second data processing unit, the data transmission unit having:
   a first memory region with a set of records, and a second memory region with a set of correlated with the first memory region's set of records; and
   transmitting parameters with the data transmission memory device comprising:
      determining when the first memory region is available to be overwritten with subsequent data;
      determining which records in a subsequent record set differ from a current record set stored in the first memory region;
      overwriting a current record in the current record set if it is determined that the current record's counterpart in the subsequent record set is different than the current record;
      determining when the second data processing unit is ready to process a new set of records; and
      copying the parameter set in the first memory region into the second memory region.

9. The method of claim 8, wherein the first memory region is a first memory bank and the second memory region is a second memory bank, and data is transmitted from the first memory bank into the second memory bank by means of a transfer bus.

10. The method of claim 8, wherein the data transmission memory device has a plurality of memory cells having a first memory element and a second memory element in each case, wherein each memory element is configured to store a single bit and wherein, when the data record stored in the first memory region is copied into the second memory region, the bit stored in the respective first memory element of a memory cell is copied into the respective second memory element of the memory cell by means of a local coupling.

11. A computer system comprising:
   a first data processing unit;
   a second data processing unit; and
   a data transmission memory device having a first memory region and a second memory region each configured to store one data record in each case, the data transmission memory device coupled on an input side to the first data processing unit and on an output side to the second data processing unit,
   wherein the data transmission memory device transfers a data record from the first data processing unit and stores it in the first memory region;
   wherein the data transmission memory device is configured to copy the data record stored in the first memory region into the second memory region when it is determined that the second data processing unit is ready for data transmission;
   wherein the data record is transferred from the second memory region and stored in the second data processing unit, further comprising transferring only data that is not contained in the data record stored in the first memory region during the transferring to the first memory region and storing in the first memory region the data contained in the data record to be transmitted; and
   wherein a records transmission process comprises determining which records in a subsequent record set differ from a current record set stored in the first memory region and overwriting a current record in the current record set if it is determined that the current record's counterpart in the subsequent record set is different than the current record.

12. The computer system of claim 11, wherein the first data processing unit is a standard processor and the second data processing unit is a coprocessor, and the data to be transmitted by means of the data transmission memory device is required for the execution of a program instruction by the coprocessor.

13. The computer system of claim 11, wherein the first memory region is a first memory bank and the second memory region is a second memory bank, and data is transmitted from the first memory bank into the second memory bank by means of a transfer bus.

14. The computer system of claim 13, wherein the first data processing unit is connected by means of a system bus to the first memory bank, and the transfer bus has a greater bandwidth than the system bus.

15. The computer system of claim 11, wherein the data transmission memory device has a plurality of memory cells having a first memory element and a second memory element in each case, wherein each memory element is configured to store a single bit and wherein, when the data record stored in the first memory region is copied into the second memory region, the bit stored in the respective first memory element of a memory cell is copied into the respective second memory element of the memory cell by means of a local coupling.

16. The computer system of claim 11, wherein both memory regions are situated on one memory chip.

* * * * *